United States Patent
Powell

[11] Patent Number: 6,155,791
[45] Date of Patent: Dec. 5, 2000

[54] WET/DRY GLYCOL PUMP AUTOMATIC SHUT-DOWN SYSTEM

[76] Inventor: Terry A. Powell, 905 Daspit Rd., New Iberia, La. 70563

[21] Appl. No.: 09/304,194

[22] Filed: May 3, 1999

[51] Int. Cl.[7] .................................................. F04B 49/025
[52] U.S. Cl. .............................. 417/36; 417/53; 417/40; 417/46; 137/413
[58] Field of Search ................................ 417/36, 40, 46, 417/53; 137/413, 414

[56] References Cited

U.S. PATENT DOCUMENTS

| | | | |
|---|---|---|---|
| 3,648,434 | 3/1972 | Gravis, III et al. | 95/192 |
| 3,651,617 | 3/1972 | Hodgson | 95/188 |
| 4,026,681 | 5/1977 | Roskelley | 55/32 |
| 4,280,867 | 7/1981 | Hodgson | 159/47.1 |
| 4,375,977 | 3/1983 | Honerkamp et al. | 55/234 |
| 4,432,779 | 2/1984 | Honerkamp et al. | 55/233 |
| 4,674,446 | 6/1987 | Padilla, Sr. | 122/33 |
| 4,676,806 | 6/1987 | Dean et al. | 55/20 |
| 5,269,886 | 12/1993 | Brigham, Sr. | 202/176 |
| 5,492,556 | 2/1996 | Garrett | 95/193 |

*Primary Examiner*—Charles G. Freay
*Assistant Examiner*—Robert Z. Evora
*Attorney, Agent, or Firm*—Robert N. Montgomery

[57] ABSTRACT

An automatic shut-down system for wet/dry glycol pump thereby providing a pump protection system located in the fluid circuit between the reboiler and glycol contactor elements of a gas dehydration system. The system includes a filter or filter system, if one is not already provided within the existing dehydration system, a vertical tank having an external gas operated float valve with controls for remotely pilot operating a cut-off valve located in the wet glycol line between the contactor and the glycol pump. Therefore, in operation, when the dry glycol level in the vertical tanks drops below a set level, the float valve blocks gas pressure applied to the cut-off valve maintaining it in the open condition, thus allowing it to close and thereby blocking the flow of wet glycol to the pump, thus effectively shutting down the pump and the system. Once the imbalance is corrected, the system automatically resumes operation.

16 Claims, 2 Drawing Sheets

WET/DRY GLYCOL PUMP AUTOMATIC SHUT-DOWN SYSTEM

BACKGROUND OF THE INVENTION

1. Field of the Invention

This invention relates generally to gas dehydration systems which utilize Wet/Dry glycol pumps and more particularly to an auxiliary system incorporated into the dehydration system for detecting loss of supply to the glycol pump and effecting shut-down of the glycol pump, thus preventing damage to the pump.

2. General Background

A great many gas dehydration systems utilize Wet/Dry glycol pumps such as that disclosed by U.S. Pat. No. 4,676,806. Although glycol pumps take many different forms, the most common is the PV series Kimray™, Glycol Energy Exchange Pump, Such pumps having wet and dry glycol outlets provide flow through the high pressure section of the pump. Dry glycol inlets and outlets provide flow through the low pressure section of the pump. Hence the pump has a first and second chamber separated by a moving piston so that flow occurs along the inlet and outlet flow paths by using energy available from the wet glycol. Systems utilizing such pumps as disclosed in U.S. Pat. No. 4,026,681 have no protection if inline filters, located between the reboiler and the pump, become fouled or insufficient level of glycol in the Reboiler occurs. Although not all dehydration systems utilize filters in the dry glycol circuit, it is considered prudent to do so. Since the pump is being driven by the energy from the high pressure wet glycol portion of the pump, the pump continues to run even when no dry glycol is flowing through the pump. This imbalance allow the pump seals to dry out and deteriorate, requiring expensive maintenance. Gas dehydration systems are often located at remote sites and are generally unmanned. Therefore, when the glycol pump is not functioning the system is also malfunctioning, thereby causing critical problems which can become hazardous. It is therefore essential that the system be shut down as soon as possible when a problem occurs.

SUMMARY OF THE INVENTION

The system disclosed herein provides a glycol pump shut-down or protection system located in the circuit between the reboiler and glycol contactor elements. The system includes a filter or filter system, if one is not already provided within the existing dehydration system, a vertical tank having an external gas operated float valve with controls for remotely pilot operating a cut-off valve located in the wet glycol line between the contactor and the glycol pump. Therefore, in operation, when the dry glycol level in the vertical tanks drops below a set level, the float valve blocks gas pressure applied to the cut-off valve maintaining it in the open condition thus allowing it to close, thereby blocking the flow of wet glycol to the pump, thus effectively shutting down the pump and the system. Once the imbalance is corrected, the system will automatically resume operation.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
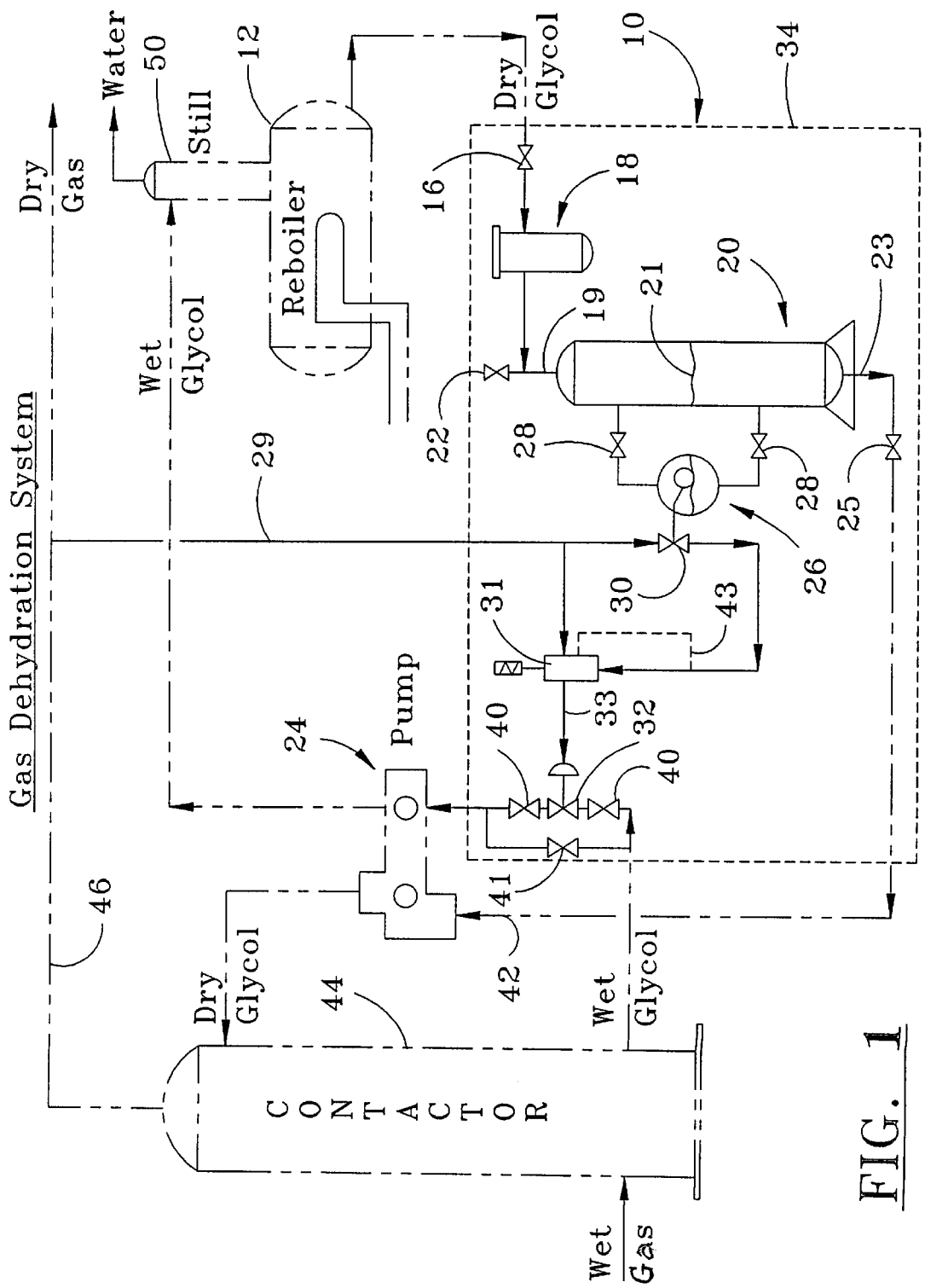
FIG. 1 is a schematic diagram of the system.

As seen in FIG. 1 the glycol pump shutdown system 10 is located in a dehydration system circuit between the reboiler 12 and the wet/dry glycol pump 24 and includes an isolation or cutoff valve 16 to allow the filter 18 to be changed, a vertical holding tank unit 20, which includes a vent/charge valve 22, a cutoff valve 25, and an external float type fluid process controller 26 isolated by valves 28. The process controller further includes a two way control valve 30 which opens and closes in accordance with the position of a float located within the process controller 26. The controller 26 effectively establishes hi-low level limits of the glycol within the tank 20. The controller 26 its float valve 30 and the piloted bypass valve 31 are supplied with pilot gas pressure through line 29. The float valve 30 supplies pressurized gas or fluid to a remote, spring operated, normally closed, pressure piloted, cutoff valve 32 through manual reset, pilot valve 31. Therefore, as long as the float valve 30 is open, gas pressure is maintained on the internal pilot line 43 thereby allowing flow from the supply line 29 to pass through the manual reset, pilot valve 31 to the pilot line 33 connected to pilot valve 32. If the float level in the controller 26 drops below a preset level the control valve 30 closes, thus reducing pressure to the manual reset, pilot valve 31, sensed through its internal pilot line 43, releasing the spring loaded spool and closing the valve 31. This disrupts the pressure to the pilot valve 32 through line 33, thus allowing the pilot valve to close, blocking flow to the pump 24. To restart the pump 24, the manual reset, pilot valve 32 must be reset manually, thus pressurizing the pilot line 33 to the pilot valve 32, thereby opening valve 32 which restores flow to the pump 24. Once flow is reestablished and the controller 26 again senses a proper level, its control valve 30, opens restoring pressure to the manual reset, pilot valve 31.

Figure 2:
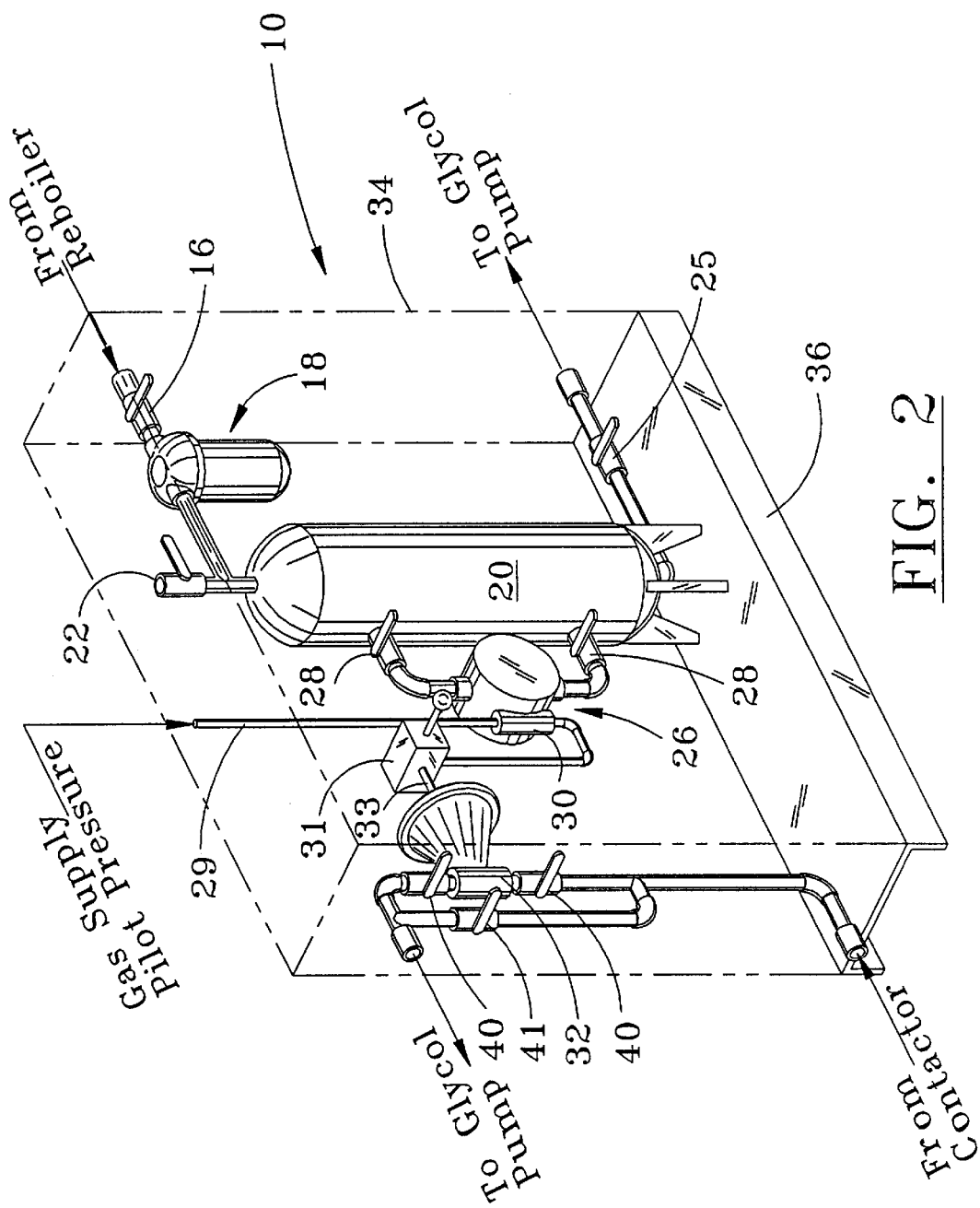
FIG. 2 is an isometric view of the system within a containment.

A pair of isolator valves 40 is located on either side of pilot valve 32 to simplify the valve replacement process. A bypass valve 41 may also be provided to allow continues operation of the system while the pilot valve 32 is being replaced. The system 10 as defined may be enclosed within a cabinet 34 and/or skid mounted 36 as seen in FIG. 2 and transported as a unit. The cabinet may include panels or doors which allow access to the system 10 for routine maintenance service.

In operation the system 10 passes dry glycol 21 from the reboiler 12 through filter 18 to vertical tank 20 at inlet 19 and out through outlet 23 to the dry glycol inlet 42 of the pump 24 as shown in the FIG. 1 diagram. The dry glycol is then pumped into a contactor 44. A portion of the dry glycol exiting the contactor 44 through line 46 is used to supply pressurized flow to the supply port of selector valve 31 via line 29 which directs pressurized flow to the float control valve 30 or to the pilot valve 32 via its two pressure ports. Wet glycol leaving the lower end of the contactor 44 is pumped via pump 24 to the still portion 50 of the reboiler 12. When fluid in the tank 20 reaches a preset level established by restricter valve 25, the controller 26 opens valve 30, thereby allowing pressurized flow to normally closed spring loaded pilot valve 32, thus holding it in the open position. Flow of wet glycol can now commence through the pump, driving the pump in first one direction and then the other. If for any reason the liquid dry glycol level in the vertical tank 20 drops below the preset level, the float controller 26 closes valve 30 causing the piloted valve 32 to close, thus stopping the action of pump 24.

It should be understood that in some cases the filter located between the vertical tanks 20 and the piloted valve 32 located in the wet glycol line feeding the wet side of the pump 24 may already exist in a dehydration system. In which case the system 10 may consist of only the vertical tank 20 and its float controller 26 valves 22, 25, 28, 30 and 31 and the necessary connections and tubing required to connect them into the system.

Because many varying and different embodiments may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. A wet/dry glycol pump shut-down system comprising:
    a) a glycol holding tank having inlet and outlet ports;
    b) a float-type controller connected to said holding tank, said controller having a control valve means in connection therewith for controlling pressure to a remote, pilot operated, cut-off valve; and
    c) the remote, pilot operated, cut-off valve connected to said control valve means.

2. The wet/dry glycol pump shut-down system according to claim 1 wherein said inlet is connected to a gas dehydration reboiler, dry glycol supply line and said outlet is connected to a wet/dry glycol pump.

3. The wet/dry glycol pump shut-down system according to claim 2 wherein said system further comprises a filter located between said reboiler and said glycol tank.

4. The wet/dry glycol pump shut-down system according to claim 1 wherein said system further comprises a manual reset, pilot valve located mesial said control valve and said cut-off valve.

5. The wet/dry glycol pump shut-down system according to claim 4 wherein said manual reset, pilot valve is internally piloted.

6. The wet/dry glycol pump shut-down system according to claim 1 wherein said control valve means is a shutoff valve operated by a float within said controller.

7. The wet/dry glycol pump shut-down system according to claim 1 wherein said remote, pilot operated, cut-off valve is in line connected to a wet glycol inlet line leading to a wet/dry pump.

8. The wet/dry glycol pump shut-down system according to claim 1 wherein said system further comprises a cabinet enclosing said system.

9. The wet/dry glycol pump shut-down system according to claim 1 wherein said system is skid mounted and transportable as a unit.

10. A shutdown system for a wet/dry glycol pump comprising:
    a) a dry glycol inlet line leading from a gas dehydration reboiler connected to a filter;
    b) a vertical, glycol tank having an upper inlet connected to said filter and a lower outlet line leading to a wet/dry glycol pump;
    c) a float valve and controller located externally of and connected fluidly to the contents of said tank;
    d) a remote, pilot operated cut-off valve connected to said float valve, said piloted cut-off valve being inline connected to a wet glycol supply line leading to a wet/dry glycol pump; and
    e) a pressurized supply line connected to said float valve.

11. The shutdown system for a wet/dry glycol pump according to claim 10 wherein said system further comprises a manual reset, pilot valve connected to said pressure supply line, to said float valve and said remote piloted cut-off valve.

12. The shutdown system for a wet/dry glycol pump according to claim 10 wherein said system is enclosed in a cabinet.

13. A method for automatically shutting down a wet/dry glycol pump located in a gas dehydration system due to insufficient flow of dry glycol to the pump comprising the steps of:
    a) providing a glycol tank having a float controller and valve means for establishing hi-low level limits of glycol within said tank and opening and closing said valve according to said limits; and
    b) connecting said controller and valve to a remote piloted cut-off valve connected inline with a wet glycol supply to a wet/dry glycol pump;
    c) connecting a pressurized supply line to said controller and valve means; and
    d) passing dry glycol from a dehydration reboiler through a supply line to said glycol tank and out of said tank to a wet/dry glycol pump.

14. The method according to claim 13 further comprising the step of providing at least one filter located in said supply line between said reboiler and said glycol tank.

15. The method according to claim 13 further comprising the step of:
    a) providing a manually resetable, piloted valve mesial said valve means and
    b) connecting said piloted valve to said pressure supply line said valve means and said remote piloted, cut-off valve.

16. The method according to claim 13 further comprising the steps of establishing a desired liquid level within said glycol tank and adjusting said controller and valve means to open and close within established limits of said desired level.

* * * * *